(No Model.)

P. T. McKAY.
PNEUMATIC TIRE.

No. 602,766.  Patented Apr. 19, 1898.

Witnesses.

Inventor:
P. T. McKay
by Fetherstonhaugh & Co

UNITED STATES PATENT OFFICE.

PETER THOMPSON McKAY, OF TORONTO, CANADA.

PNEUMATIC TIRE.

SPECIFICATION forming part of Letters Patent No. 602,766, dated April 19, 1898.

Application filed February 1, 1898. Serial No. 668,702. (No model.)

*To all whom it may concern:*

Be it known that I, PETER THOMPSON MCKAY, of the city of Toronto, in the county of York, in the Province of Ontario, Canada, have invented certain new and useful Improvements in Pneumatic Tires, of which the following is a specification.

My invention relates to improvements in pneumatic tires for bicycle and other wheels; and the object of the invention is to design a positive and secure fastening for the edges of the tire upon the rim; and it consists, essentially, in providing within the edge loop of the canvas two complete chains of arc-shaped wire links, which are designed to grip the rim and hold the tire in place when inflated in the manner hereinafter more particularly explained.

Figure 1:
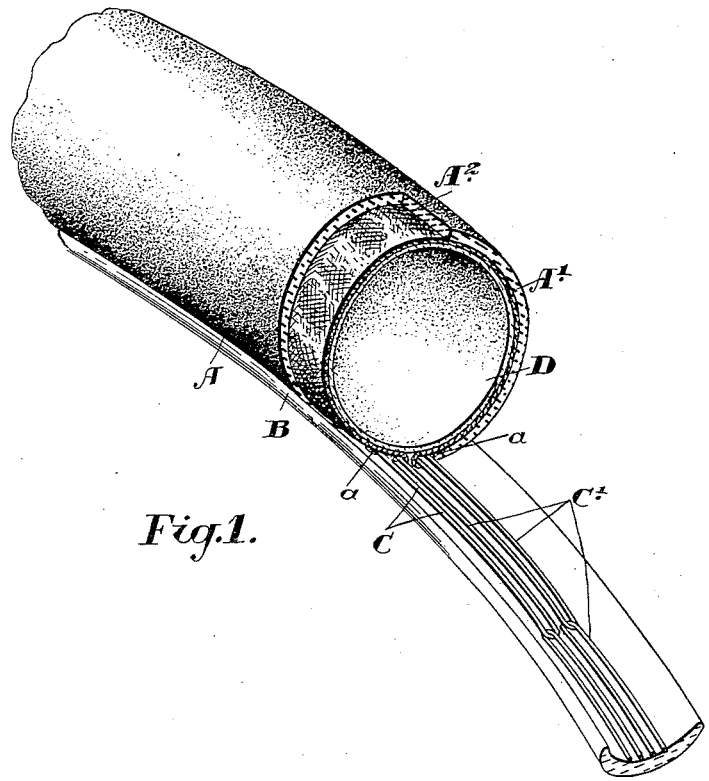
Figure 2:
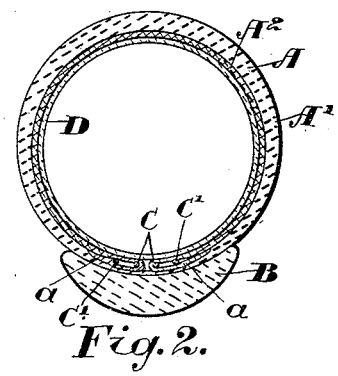
Figure 3:
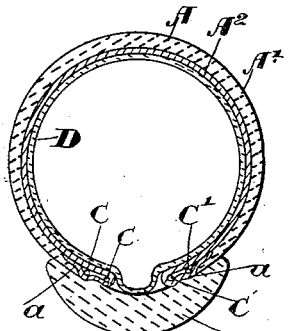

Figure 1 is a perspective view of portion of a tire and rim of a bicycle, showing the applicability of my invention. Fig. 2 is a cross-section showing my tire-fastening as applied to a crescent-shaped rim. Fig. 3 is a cross-section showing my invention as applied to the form commonly known as the "Dunlop" rim.

In the drawings like letters of reference indicate corresponding parts in each figure.

A is the tire, which is composed of the outer portion A' and inner canvas portion A², which is provided with edge loops a, formed by turning the canvas back upon itself. The canvas of course is cemented in the usual manner to the outer cover A.

B is the rim.

C is the chain, comprising a series of arc-shaped links C', preferably of wire, the arc of which corresponds substantially to the arc of the circle of the rim. The links are connected to each other at right angles, one to the other, but when pressed against the rim by the pressure of the air in the air-tube D the main portion of each link lies flat down upon the rim. The connecting portions of the two links, however, form a projection which by the force of the pressure of the air-tube serves to embed itself into the rim so securely, I find in practice, that the tire is held securely in place without it being necessary to use any cement whatsoever in any form of rim to which I may apply my binding device for the edges of the tire.

I am aware that several devices have been used in the form of circumferential wires within the loops formed at the edge of the tire to hold the edges of the tire, and consequently the tire to the rim; but I do not wish to claim any such device.

What I claim as my invention is—

In a bicycle or other wheel, in combination the rim, the tire provided with edge loops, the air-tube located within same and the wire chains extending through each edge loop circumferentially around the rim and comprising arc-shaped links connected at right angles whereby the links are projected at the joints against the rim and the main body of each arc-shaped link is held flat by the pressure of the air-tube as and for the purpose specified.

PETER THOMPSON McKAY.

Witnesses:
  B. BOYD,
  H. DENNISON.